United States Patent [19]

Katou

[11] Patent Number: 5,508,997
[45] Date of Patent: Apr. 16, 1996

[54] BUS COMMUNICATION METHOD AND BUS COMMUNICATION SYSTEM

[75] Inventor: Junichi Katou, Kawasaki, Japan

[73] Assignee: Fujitsu Limited, Kanagawa, Japan

[21] Appl. No.: 407,773

[22] Filed: Mar. 21, 1995

[30] Foreign Application Priority Data

Jul. 4, 1994 [JP] Japan ................... 6-151896

[51] Int. Cl.$^6$ .................. H04L 12/24; H04L 12/40
[52] U.S. Cl. .................. 370/16; 370/859; 370/92
[58] Field of Search .................. 370/16, 85.1, 859, 370/54, 60, 67, 92; 340/827; 371/8.1, 8.2, 11.1, 11.2, 9.1

[56] References Cited

U.S. PATENT DOCUMENTS

| | | | |
|---|---|---|---|
| 5,014,261 | 5/1991 | Shinbashi et al. | 370/16 |
| 5,153,874 | 10/1992 | Kobono | 370/16 |
| 5,329,521 | 7/1994 | Walsh et al. | 370/16 |
| 5,329,528 | 7/1994 | Akai et al. | 370/16 |
| 5,442,631 | 8/1995 | Tanaka et al. | 370/85.9 |

FOREIGN PATENT DOCUMENTS

| | | |
|---|---|---|
| 61-1112451 | 5/1986 | Japan . |
| 122834 | 9/1989 | Japan . |
| 234062 | 2/1990 | Japan . |
| 3234136 | 10/1991 | Japan . |

*Primary Examiner*—Hassan Kizou
*Assistant Examiner*—Seema S. Rao

[57] ABSTRACT

Apparatus addresses 0A, 0B are respectively set to redundant apparatuses each of which is provided first and second unit and status addresses 01, 02 are respectively assinged to active state and stanby state. An address decision means decides an unit address of respective one of the first and second units in the redundant apparatus by combining an apparatus address of the redundant apparatus and the unit status address determined in accordance with whether the unit is active or standby. A source unit generates a destination address by combining the status address of the destination unit and the apparatus address of destination redundant apparatus to which the destination unit belongs and sends data to a system bus with said destination address attached thereto. A destination unit having an unit address which is the same as the destination address receives the data from the system bus and performing processing in accordance with said data.

10 Claims, 11 Drawing Sheets

FIG. 7

| STATE | UNIT STATUS ADDRESS |
|---|---|
| FIRST ACTIVE STATE | 01 |
| SECOND ACTIVE STATE | 02 |
| STANDBY STATE | 03 |

FIG. 8

| STATE | UNIT STATUS ADDRESS |
|---|---|
| FIRST ACTIVE STATE | 01 |
| SECOND ACTIVE STATE | 02 |
| THIRD ACTIVE STATE | 03 |
| ⋮ | ⋮ |
| n-th ACTIVE STATE | n |
| STANDBY STATE | n+1 |

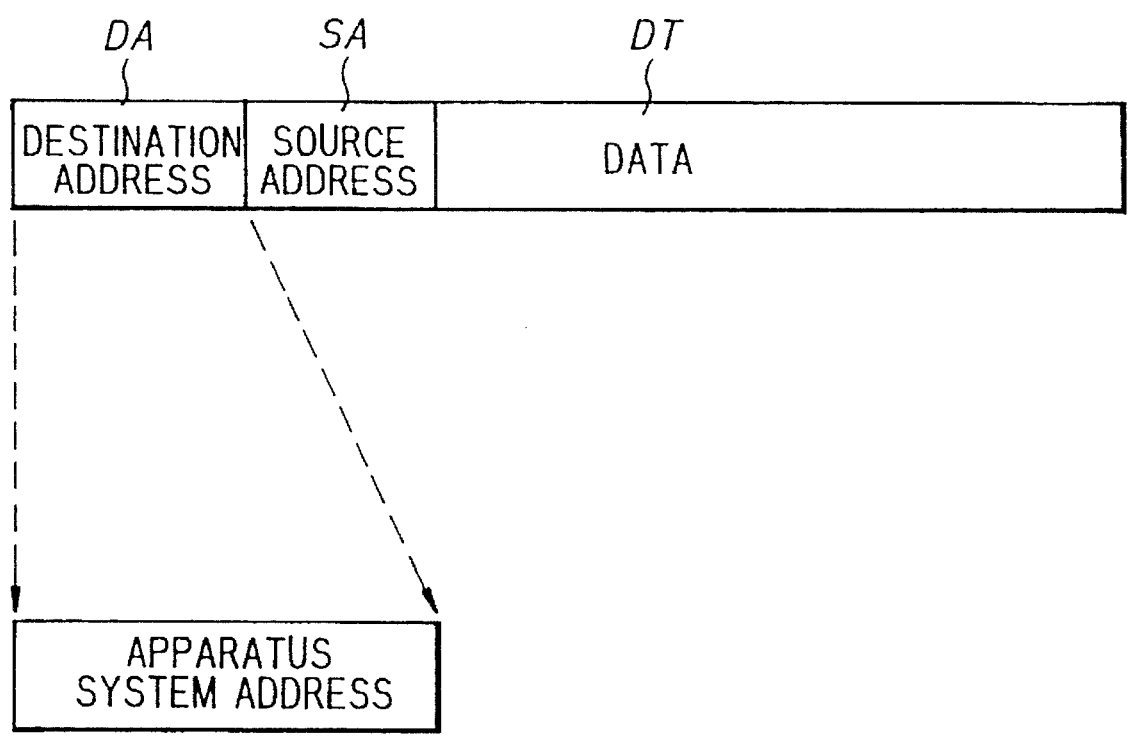

BUS COMMUNICATION METHOD AND BUS COMMUNICATION SYSTEM

BACKGROUND OF THE INVENTION

This invention relates to bus communication method and bus communication system. More particularly, the invention relates to bus communication method and bus communication system for sending data with destination address and source address attached thereto from a source unit to a destination unit via a system bus, wherein connected to the system bus are redundant apparatuses each of which is provided with n number of units (n≧2) for working respectively active unit and standby unit and is possible to perform processing continuously by switching over to the standby unit if one of the active units fails.

A system for communicating data between units each other via a system bus to which a plurality of units are connected is well known. FIG. 12A and FIG. 12B are for explaining conventional system bus communication method, in which numeral 1 denotes a system bus, numeral 2 a redundant apparatus which is refered to as apparatus A hereinafter, and numeral 3 a redundant apparatus which is refered to as apparatus B hereinafter. The redundant apparatuses 2,3 have respectively redundant structure and provided with units 2a, 3a of system 0 and units 2b, 3b of system 1. The units 2a, 2b and the units 3a, 3b are all able to work as not only an active unit, but also a standby unit and processing is continued by switching over to the standby unit if the active unit fails.

Data is sent from one of the units in the source redundant apparatus to one of the units in the destination redundant apparatus by attaching destination address DA for specifying destination unit and source address SA for specifying source unit to the data as shown in FIG. 13. Since a inherent unit address is assigned to each unit of system 0 and system 1 in the redundant apparatus, the source unit attaches the unit addresses to the data as a source address and a destination address.

According to the above-mentioned system, each unit in the redundant apparatuses is in active or standby state and the state of the unit is changed in accordance with the condition of system operation. For reasons of this, it is general for a source unit to decide a destination address by recognizing whether each unit in destination redundant apparatus is active or stanby and start communication between units. More specifically, in a case where a source unit sends data to an active unit in the destination redundant apparatus, the source unit must check which unit in the destination redundant apparatus is active. If a unit 3a of system 0 is active, the source unit attaches the unit address of the unit 3a of system 0 as a destination address to data to be sent and sends the data thereafter. For example, assuming that in FIG. 12A ④ address of the unit 2a of system 0 in the apparatus A is "0A00", ② address of the unit 2b of system 1 is "0A01", ③ address of the unit 3a of system 0 in the apparatus B is "0B00", ④ address of the unit 3b of system 1 is "0B01" and ⑤ the unit 3a of system 0 is active, the destination address becomes "0B00". On the other hand, if the unit 3b of system 1 is active as shown in FIG. 12B, the destination address becomes "0B01".

In the above, although it is described that the data is sent to the active destination unit, maintainance data and apparatus management data are sent to the standby unit. If the communication data has to be sent to the standby unit, the source unit must check which unit in the destination redundant apparatus is standby. And if a unit of system 0 is standby, the source unit attaches the address of the unit of system 0 to the data as a destination address and if a unit of system 1 is standby, the source unit attaches the address of the unit of system 1 to the data as a destination address and sends the data thereafter.

According to the conventinal communication system, address of each unit in the redundant apparatus is fixed. By reason of this, in a case where data has to be sent to active or stadby unit, it is necessary for the source unit to distinguish which unit among units of system 0 and system 1 in the destination apparatus is active or standby. As a result, there is provided in the communication system a state management mechanism which is composed of a communication means for communicating the state information each other between redundant apparatuses or units, a memory for storing the state of each unit in all apparatus and so on. However, there is problem that the state management mechanism has complex structure which causes high price of the system.

SUMMARY OF THE INVENTION

A first object of the present invention is to send data certainly to a destination unit which is in the desirable state without recognizing the state of the units (system 0 and system 1) in the destination redundant apparatus.

A second object of the present invention is to generate the destination address by combining an apparatus address which is inherent in the destination redundant apparatus and a status address which is determined in accordance with whether the destination unit is active or standby.

A third object of the present invention is to decide status address of the unit in accordance with whether it is active or standby and generate a destination address combining an apparatus address which is inherent in the destination redundant apparatus and a status address of the destination unit.

A fourth object of the present invention is to send data to a destination unit which is in the desirable state without recognizing state of the units in the destination redundant apparatus, even if the destination redundant apparatus is provided with n number of units (n≧3) each of which is in a certain state among the various active states and standby state.

A fifth object of the present invention is to send data via a system bus in the desirable state when system buses have a redundant structure, without recognizing each system bus is active or standby.

In accordance with the present invention, the first through the third objects are attained by setting an apparatus address to each redundant apparatus and assigning an unit status address to respective one of active state and standby state, deciding an unit address of respective one of the first and second units in the redundant apparatus by combining the apparatus address of said redundant apparatus and the unit status address determined in accordance with whether the unit is active or standby, generating in the source unit, a destination address by combining the unit status address of the destination unit and the apparatus address of destination redundant apparatus to which the destination unit belongs and sending data to the system bus with said destination address attached thereto, and receiving the data from the system bus and performing processing in accordance with said data by the destination unit having an unit address which is the same as said destination address.

In accordance with the present invention, the fourth object is attained by setting an apparatus address to each redundant apparatus and assigning an unit status address to respective one of various active states and standby state, deciding an unit address of respective one of n number of the units in the redundant apparatus by combining the apparatus address of said redundant apparatus and the unit status address of the unit, generating in the source unit, a destination address by combining the unit status address of the destination unit and the apparatus address of destination redundant apparatus to which the destination unit belongs and sending data to the system bus with said destination address attached thereto, and receving the data from the system bus and performing processing in accordance with said data by the destination unit having an unit address which is the same as said destination address.

In accordance with the present invention, the fifth object is attained by providing a bus switching means in a case where system buses are redundant, generating a destination address in accordance with whether the data is sent to a destination redundant apparatus by way of which redundant system bus, whether the data is sent to the destination redundant apparatus by way of which system bus of active and standby system buses composing the redundant system bus and whether the data is sent to which unit of active and standby units in the destination redundant apparatus, sending the data to a system bus on the source side with said destination address attached thereto and said bus switching means receiving the data from the system bus on the source side and sending said data to a system bus on the destination side which is appointed by the destination address attached to the data. Other features and advantages of the present invention will be apparent from the following description taken in conjunction with the accompanying drawings.

BRIEF DESCRIPTION OF THE DRAWINGS

FIG. 7 is a diagram for describing status address in case of triple redundant structure;

FIG. 8 is a diagram for describing status address in case of (n+1)-multiplex redundant structure;

FIG. 13 is a diagram for describing structure of data to be sent.

DESCRIPTION OF THE PREFERRED EMBODIMENTS (A) General feature of the invention FIG. 1 is a diagram for describing the general features of the present invention. Numerals 10, 20 denote redundant apparatuses, numeral 30 a system bus to which the redundant apparatuses are conneceted, and numeral 40 data to be sent.

Figure 1:
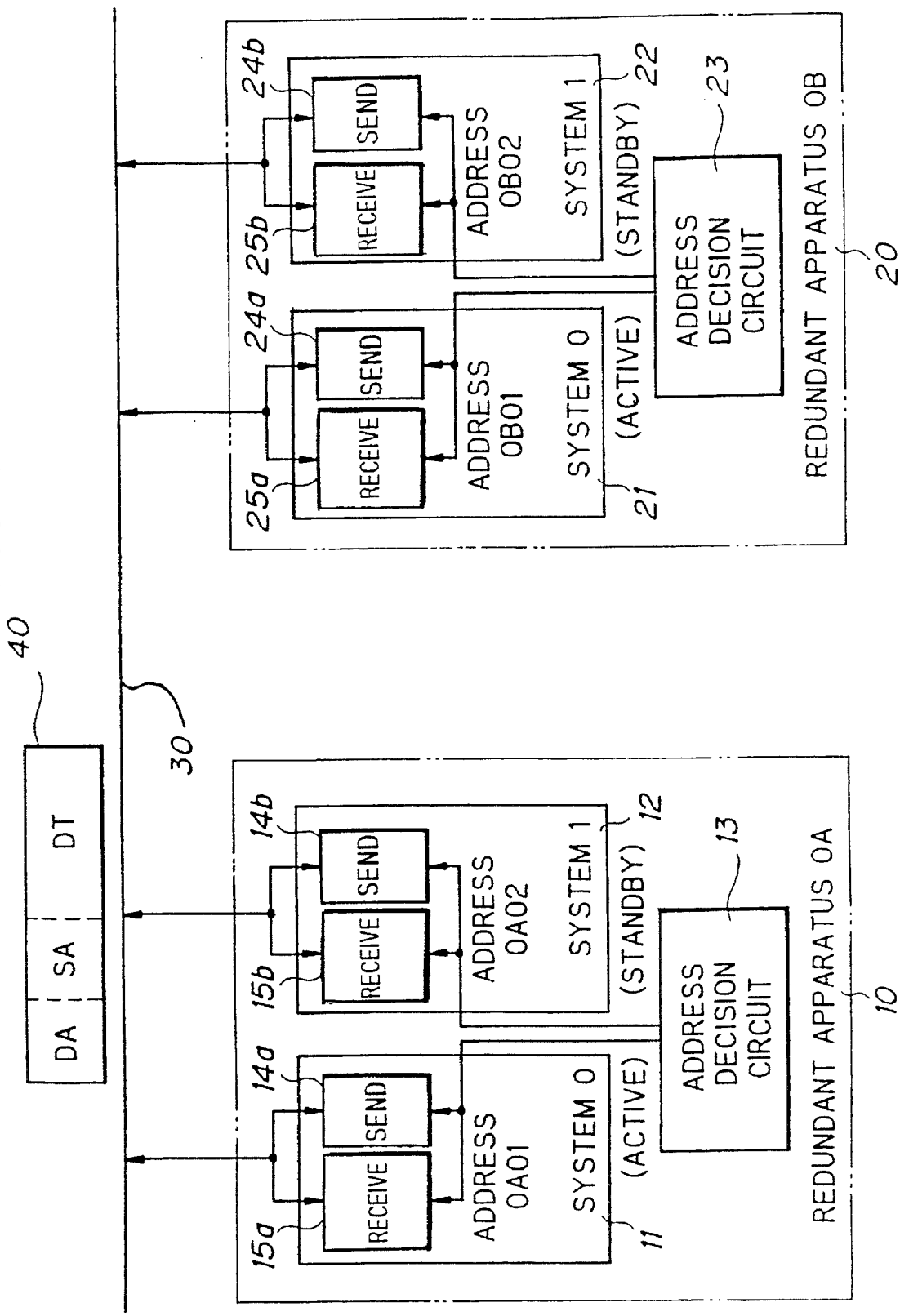
FIG. 1 is a diagram for describing the general feature of the present invention.

In the redundant apparatus 10, numeral 11 denotes an unit of system 0, numeral 12 an unit of system 1, 13 an address decision circuit for deciding dynamically unit address of respective one of the units 11 and 12 in accordance with whether it is active or standby and for setting the unit address to it, numerals 14a, 14b data sending sections, each of which is provided on respective one of the units 11 and 12, generates a destination address in accordance with whether data is sent to which unit of active or standby unit in the destination redundant apparatus, and sends the data to the system bus 30 with the destination address attached thereto, and numerals 15a, 15b data receiving sections, each of which is provided on respective one of the units 11 and 12, and receives the data from the system bus 30 when the destination address attached to the data is the same as its own unit address.

In the redundant apparatus 20, numeral 21 denotes an unit of system 0, numeral 22 an unit of system 1, 23 an address decision circuit for deciding dynamically unit address of respective one of the units 21 and 22 in accordance with whether it is active or standby and for setting the unit address to it, numerals 24a, 24b data sending sections, each of which is provided on respective one of the units 21 and 22, generates a destination address in accordance with whether data is sent to which unit of active or standby unit in the destination redundant apparatus, and sends the data to the system bus 30 with the destination address attached thereto, and numerals 25a, 25b data receiving sections, each of which is provided on respective one of the units 21 and 22, and receives the data from the system bus 30 when the destination address attached to the data is the same as its own unit address.

Apparatus address "0A" is set to the redundant apparatus 10, as well as apparatus address "0B" is set to the redundant apparatus 20. Further, unit status address "01" is assigned to the active state as well as unit status address "02" is assigned to the standby state. The address decision circuit 13 decides dynamically the unit address of the unit 11 of system 0 and unit address of the unit 12 of system 1 in the redundant apparatus 10 by combining the apparatus address (0A) and the unit status address (01 or 02) determined in accordance with whether the unit is active or standby and sets the unit address of each unit to the data sending sections 14a, 14b and the data receiving sections 15a, 15b. For example, on the assumption that the unit 11 of system 0 is active and the unit 12 of system 1 is standby, the unit address of the unit 11 of system 0 becomes 0A01 and the unit address of the unit 12 of system 1 becomes 0A02. In the same manner, assuming that the unit 21 of system 0 in the redundant apparatus 20 is active and the unit 22 of system 1 is standby, the unit address of the unit 21 of system 0 becomes 0B01 and the unit address of the unit 22 of system 1 becomes 0B02.

The data sending section 14a of the active unit 11 in the source redundant apparatus 10 generates a destination address DA by combining the unit status address (01 or 02) of the destination unit and the apparatus address 0B of the destination redundant apparatus 20 to which the destination unit belongs and sends data 40 to the system bus 30 with said destination address attached thereto. For example, in a case where data is sent to an active unit in the destination redundant apparatus 20, the destination address DA is 0B01. The data receiving section 25a of the unit 21 of system 0 in the redundant apparatus 20 receives data 40 and supplies it to a data processing unit (not drawn), since its own unit address 0B01 set by the address decision circuit 23 is the same as the destination address DA contained in the data 40.

On the other hand, in a case where data is sent to a standby unit in the destination redundant apparatus 20, the destination address DA is 0B02. The data receving section 25b of the unit 22 of system 1 in the redundant apparatus 20 receives data 40 and supplies it to a data processing unit (not drawn), since its own unit address 0B02 set by the address decision circuit 23 is the same as the destination address DA contained in the data 40.

If the state of the unit 21 of system 0 and state of the unit 22 of system 1 change to other state together (active→standby and standby→active), the address decision circuit 23 changes dynamically the unit addresses of the units 21, 22 resulting in that the unit address of the unit 21 of system 0 becomes 0B02 and the unit address of the unit 22 of system 1 becomes 0B01. As a result, when the destination address 0B01 is attached to the data in order to send it from the source unit to the active unit in the destination redundant apparatus 20, the data is received by the unit 22 of system 1.

From the foregoing, since unit address of respective one of the units in the redundant apparatuses 10, 20 is decided dynamically by combining ① the apparatus address and ② the status address assigned to the active and standby state and set to each unit, the source unit can generate the destination address DA if it recognizes that ① the data should be sent to which redundant apparatus and ② the data should be sent to which unit of active and standby units. As a result, the source unit need not know the actual state of the units of system 0 and 1 in the destination redundant apparatus. Accordingly, there is no need to provide a state management mechanism which is composed of a communication means for communicating the state information between redundant apparatuses, a memory for storing the state of each unit in every apparatus and so on, resulting in simplification of the system and low price of the system. Further, since there is no need to communicate the states information between the apparatuses, data communication between them is possible on system sets up.

In the above, while it is explained that the source unit sends the data to the destination unit with the destination address attached thereto, similarly the source unit attaches a source address to the data and send it so that the destination unit can recognize the source unit by the source address. In addition to that, while the system having the redundant apparatuses each of which is provided two units is explained, the present invention is able to be applied to the system having redundant apparatuses each of which is provided with n number of units (≧3). Further, the present invention is able to be applied to the system in which the system buses are redundant.

(B) First embodiment of the present invention (a) Address structure

Figure 2:
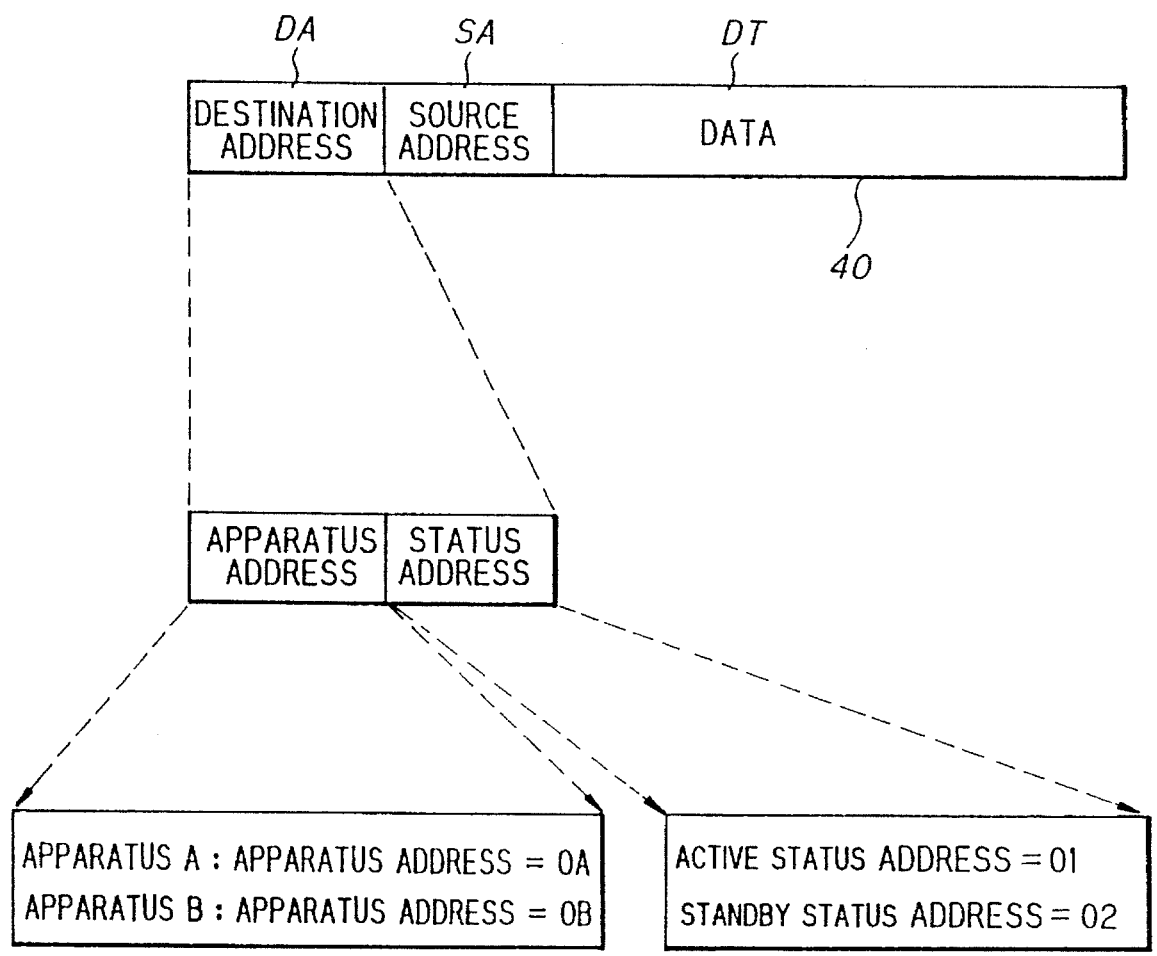
FIG. 2 is a diagram for describing address structure of the present invention.

In the system in which data is sent via a bus between two apparatuses, as shown in FIG. 2 a destination address DA for specifying a destination unit and a source address SA for specifying a source unit are attached to the data DT. And in a case where each apparatus connected to the bus has redundant structure which is provided with an unit of system 0 and an unit of system 1, the unit address of respective one of the units is decided dynamically on a basis of the combination of ① an apparatus address and ② an unit status address determined in accordance with whether the unit is active or standby.

Figure 3:
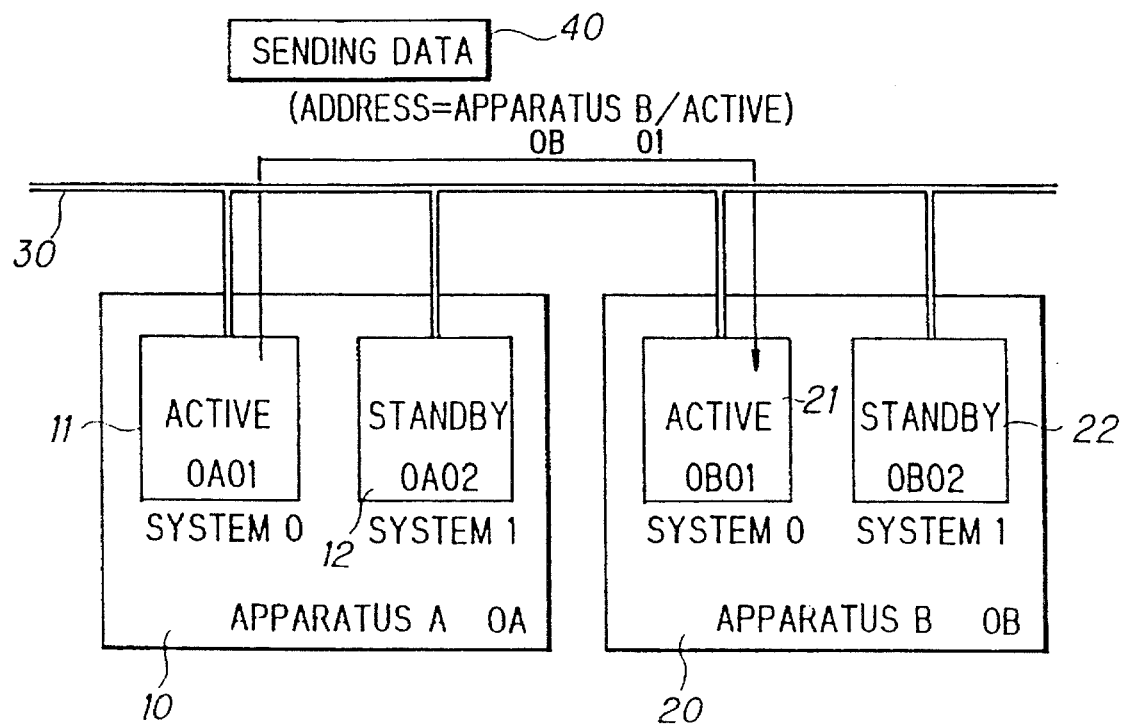
FIG. 3 is a first block diagram for describing dynamic address setting method and destination address decision method of the present invention.
Figure 4:
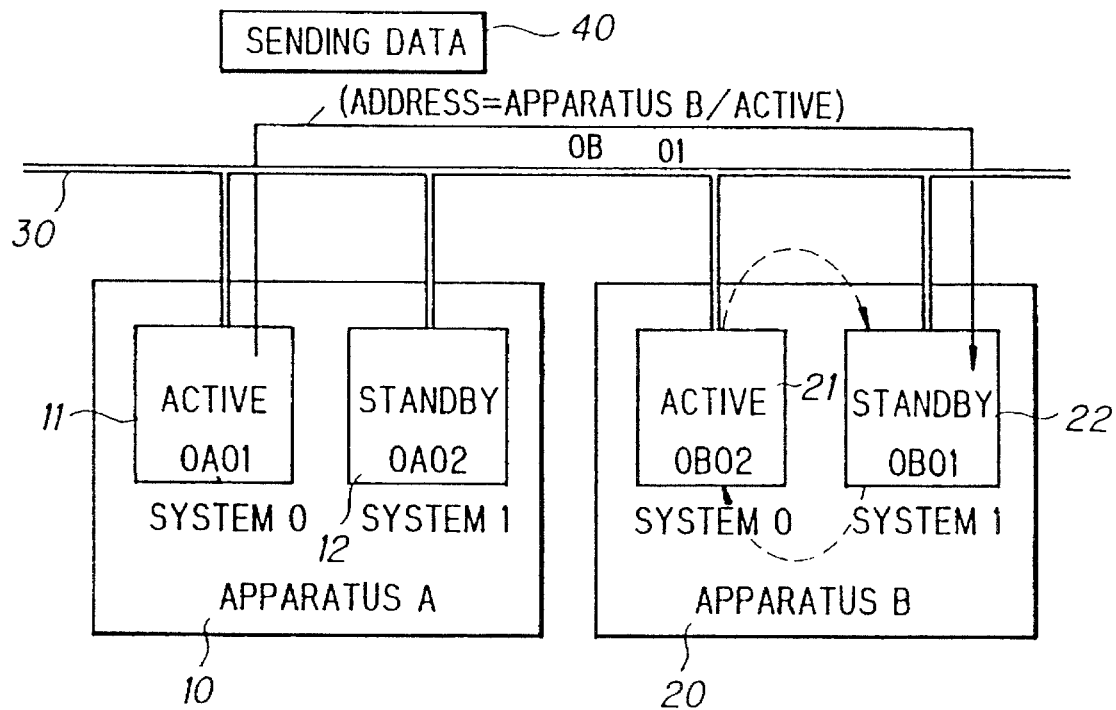
FIG. 4 is a second block diagram for describing dynamic address setting method and destination address decision method of the present invention.

FIGS. 3 and 4 are block diagrams for describing how to decide dynamically an unit address and destination address. In FIGS. 3 and 4, numerals 10, 20 denote redundant apparatuses (apparatus A, apparatus B), numeral 30 a system bus to which the redundant apparatuses 10, 20 are conneceted, and numeral 40 data to be sent. The redundant apparatus 10 is provided with an unit 11 of system 0 and an unit 12 of system 1, and the redundant apparatus 20 is provided with an unit 21 of system 0 and an unit 22 of system 1. Each of the units 11, 12 can assume whichever state of active state and standby state as well as each of the units 21, 22 can assume whichever state of active state and standby state. And it is possible to perform processing continuously by switching over to the standby unit if the active unit fails.

Apparatus address "0A" is inherently set to the redundant apparatus 10, as well as apparatus address "0B" is inherently set to the redundant apparatus 20. Further, unit status address "01" is assigned to the active state as well as unit status address "02" is assigned to the standby status. As a result, the unit address of each unit in the redundant apparatus dynamaically changes in accordance with whether the unit is active or standby. For example, as shown in FIG. 3 if the unit 11 of system 0 in the redundant apparatus 10 is active and the unit 12 of system 1 is standby, the unit address of the unit 11 of system 0 becomes 0A01 and the unit address of the unit 12 of system 1 becomes 0A02.

In the same manner, if the unit 21 of system 0 in the redundant apparatus 20 is active and the unit 22 of system 1 is standby, the unit address of the unit 21 of system 0 becomes 0B01 and the unit address of the unit 22 of system 1 becomes 0B02. And as shown in FIG. 4 when the unit 21 of system 0 in the redundant apparatus 20 becomes standby and the unit 22 of system 1 becomes active due to the operation circumstances, the unit address of the unit 21 of system 0 changes to 0B02 and the unit address of the unit 22 of system 1 changes 0B01.

(b) Destination address

The destination address DA attched to sending data is generated by combining ① the apparatus address of the destination redundant apparatus and ② the unit status address (01 or 02) of the destination unit which belongs to the destination apparatus. For example, in a case where data is sent to an active unit in the destination redundant apparatus 20, the destination address DA is 0B01. Accordingly, when the data accompanied with the destination address 0B01 reaches to the destination redundant apparatus 20 in FIG. 3, a data receving section of the unit 21 of system 0 receives the data and supplies it to a data processing unit (not drawn), since the unit address 0B01 of the unit 21 set dynamically is the same as the destination address DA contained in the data 40. On the other hand, in a case where data accompanied with the destination address 0B01 reaches to the destination redundant apparatus 20 in FIG. 4, a data receving section of the unit 22 of system 1 receives data 40 and supplies it to a data processin unit (not drawn), since the unit address 0B01 of the unit 22 set dynamically is the same as the destination address DA contained in the data 40.

(c) Structure of the redundant apparatus

Figure 5:
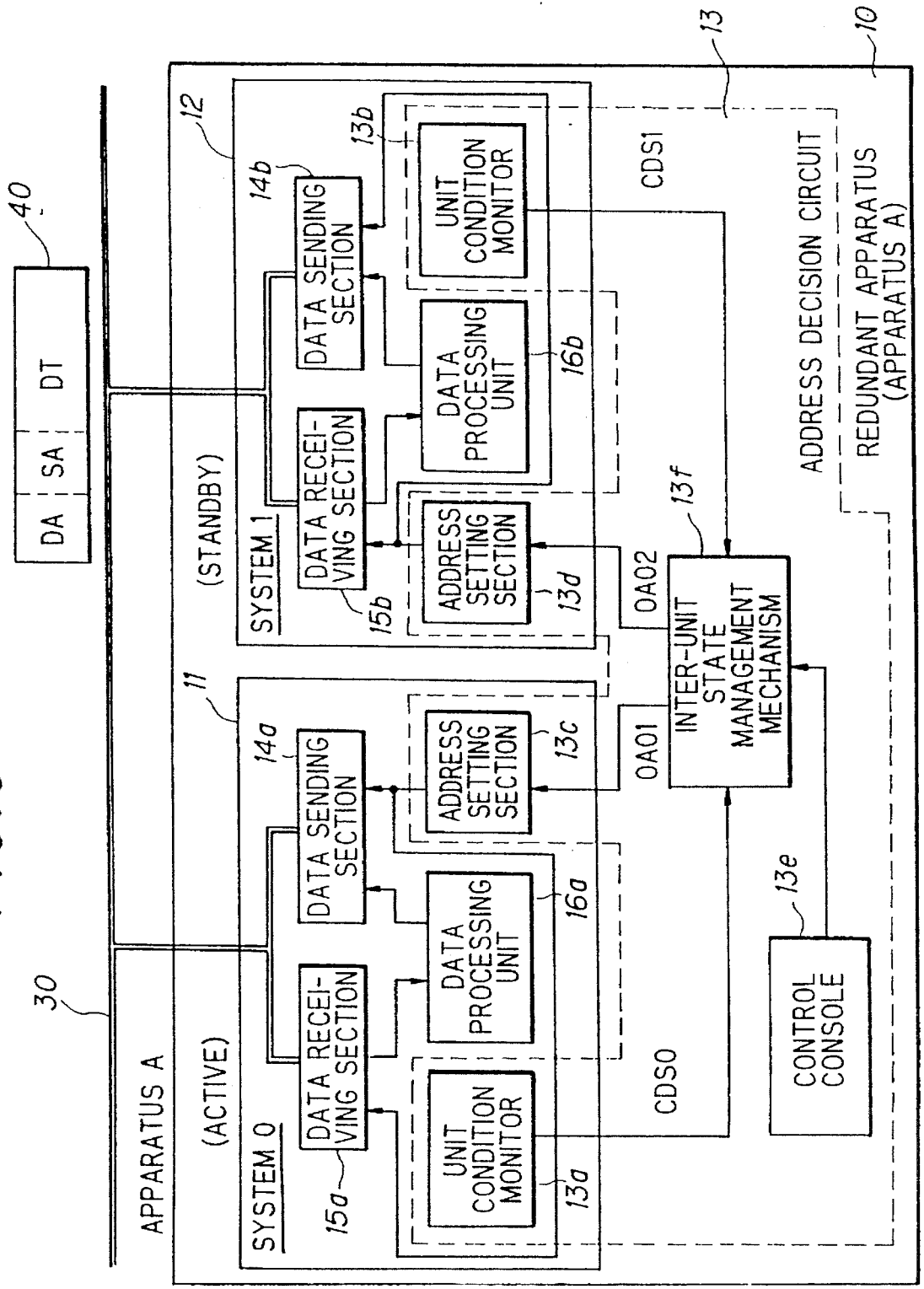
FIG. 5 is a block diagram for describing a redundant apparatus of the present invention.

FIG. 5 is a block diagram for describing a redundant apparatus 10 of the present invention. Other redundant apparatus 20 has the same structure of the apparatus 10.

In FIG. 5, numerals 10 denotes redundant apparatus, numeral 30 a system bus to which the redundant apparatuses are conneceted, and numeral 40 data to be sent. In the redundant apparatus 10, numeral 11 denotes an unit of system 0, numeral 12 an unit of system 1, 13 an address decision circuit for deciding dynamically unit address of respective one of the units 11 and 12 in accordance with whether the unit is active or standby and for setting the unit address to it, numerals 14a, 14b data sending sections, each of which is provided on respective one of the units 11 and 12, numerals 15a, 15b data receiving sections, each of which is provided on respective one of the units 11 and 12, and numerals 16a, 16b data processing units.

Each of the data sending sections 14a, 14b ① generates a destination address in accordance with whether data is sent to which unit of active or standby unit in the destination redundant apparatus, ② holds its own unit address supplied from the address decision circuit 13 as a sorce address SA and ③ sends the data outputted from respective one of the data processing units 16a, 16b to the system bus 30 with the destination address DA and the source address SA attached thereto.

Each of the data receiving sections 15a, 15b ① holds the unit address supplied from the address decision circuit 13 as its own unit address and ② receives the data 40 from the system bus 30 when the destination address attached to the data is the same as its own unit address and inputs it to respective one o the data processing units 16a, 16b.

In the address decision circuit 13, numerals 13a, 13b denote unit condition monitors for outputting condition detection signals CDS0, CDS1 by detecting abnormality of the units 11, 12. Numerals 13c, 13d denote address setting sections for setting the unit address decided by an inter-unit state management mechanism to the data sending section and data receiving section. Numeral 13e denotes a control console for setting initial state (active state, standby state) of the unit 11 of system 0 and the unit 12 of system 1, setting an apparatus address of the redundant appratus 10 and assigning an unit status address to respective one of the active and standby state. Numeral 13f denotes an inter-unit state management mechanism for monitoring the state of the units 11, 12, deciding dynamically the unit address (for example, 0A01, 0A02) of respective one of the units 11, 12 by combining the apparatus address of the redundant apparatus 10 and the unit status address determined in accordance with the state of the unit, and inputting the unit addresses to the address setting sections 13c, 13d.

(d) Control for sending and receiving data

The control console sets an apparatus address 0A to the redundant apparatus 10 as well as it assigns respectively unit status addresses 01, 02 to the active state and standby state. The inter-unit state management mechanism 13f in the address decision circuit 13 decides dynamically the unit address of respective one of the units 11, 12 by combining the apparatus addrss 0A of the redundant apparatus 10 and the unit state address (01 or 02) determined in accordance with the state of the unit, and inputs the unit address to the address setting sections 13c, 13d. The address setting sections 13c, 13d set the inputted unit addresses to the data sending sections 14a, 14b and the data receiving sections 15a, 15b. For example, when the unit 11 of system 0 is active and the unit 12 of system 1 is standby, the unit address of the unit 11 becomes 0A01 and the unit address of the unit 12 becomes 0A02.

Similarly when the unit 21 (see FIG. 3) of system 0 is active and the unit 22 of system 1 is standby in the redundant apparatus 20, the unit address of the unit 21 becomes 0B01 and the unit address of the unit 22 becomes 0B02, and each unit address is set to the data sending sections and the data receiving sections of the units 21, 22.

The data sending section 14a of the active unit 11 of system 0 in the source redundant apparatus 10 ① generates a destination address DA in accordance with whether data is sent to which unit of active or standby unit in the destination redundant apparatus 20, ② holds its own unit address supplied from the address setting section 13c as a source address SA and ③ sends the data outputted from the data processing units 16a to the system bus 30 with the destination address DA and the source address SA attached thereto. For example, in a case where data is sent to an active unit in the destination redundant apparatus 20, the destination address DA is 0B01 and in a case where data is sent to a standby unit in the destination redundant apparatus 20, the destination address DA is 0B02.

The data receiving sections of the active unit 21 of system 0 and the standby unit 22 of system 1 in the destination redundant apparatus 20 respectively descriminate if the destination address DA contained in the delivered data agrees with their own unit addresses 0B01, 0B02 set dynamically and receive the data if the agreement is obtained. For example, when the data 40 accompanied with the destination address 0B01 is sent to the active unit in the redundant apparatus 20 by way of the system bus 30, the unit 21 of system 0 receives the data and inputs it to the data processing unit since the destination address DA contained in the data 40 agrees with its own unit address 0B01. And when the data 40 accompanied with the destination address 0B02 is sent to the standby unit in the redundant apparatus 20 by way of the system bus 30, the unit 22 of system 1 receives the data and inputs it to the data processing unit since the destination address DA contained in the data 40 agrees with its own unit address 0B02.

On the other hand, when the unit 21 of system 0 in the redundant apparatus 20 is standby and the unit 22 of system 1 is active as shown in FIG. 4, the following data receipt operation is performed. That is to say, when the data 40 accompanied with the destination address 0B01 is sent to the active unit in the redundant apparatus 20 by way of the system bus 30, the unit 22 of system 1 receives the data and inputs it to the data processing unit since the destination address DA contained in the data 40 agrees with its own unit address 0B01. And when the data 40 accompanied with the destination address 0B02 is sent to the standby unit in the redundant apparatus 20 by way of the system bus 30, the unit 21 of system 0 receives the data and inputs it to the data processing unit since the destination address DA contained in the data 40 agrees with its own unit address 0B02.

From the foregoing, since the unit address of respective one of the units in the redundant apparatuses is decided dynamically ① the apparatus address and ② the unit status address assigned to the active and standby state and set to each unit, the source unit can generate the destination address DA if it recognizes that ① data should be sent to which redundant apparatus and ② the data should be sent to which unit of active and standby units. As a result, the source unit need not know the actual state of the units (system 0 and system 1) in the destination redundant apparatus. Accordingly, there is no need to provide a state management mechanism which is composed of a communication means for communicating the state information between redundant apparatuses, a memory for storing the state of each unit in every apparatus and so on, resulting in simplification of the system and low price of the system. Further, since there is no need to communicate the state information between the apparatuses, data communication between them is possible as soon as the system sets up.

(e) Modification

In the above, while the system having the redundant apparatuses each of which is provided two units and connected to the system bus is described, the present invention is able to be applied to the system provided with redundant apparatuses each of which has n number of units ($\geq 3$).

Figure 6:
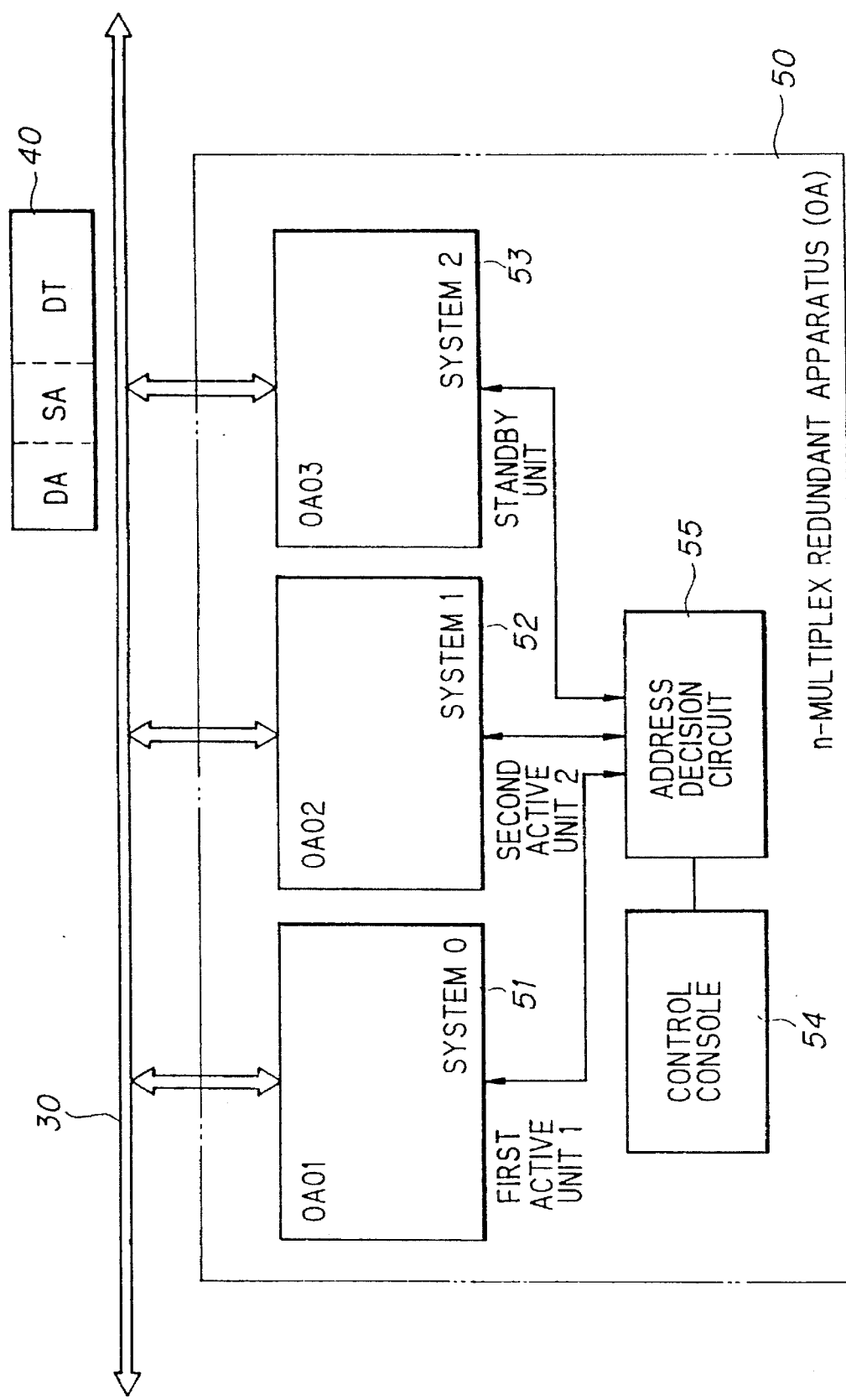
FIG. 6 is a block diagram for describing a redundant apparatus provided with n-multiplex structure.

FIG. 6 is a block diagram for describing a redundant apparatus provided with n-multiplex structure having n number of units ($\geq 3$). Numeral 50 denotes a redundant apparatus provided with n-multiplex structure and numerals 51–53 respectively denote unit of system 0, unit of system 1 and unit of system 2 and the structure of each unit is the same as that of the units 11, 12 in FIG. 5. Each of the units 51–53 can assume whichever state among the first active state, second active state and standby state and it is possible to perform processing continuously by switching over to the standby unit if the first or second active unit fails.

Numeral 54 denotes a control console for setting an initial state of the unit 51 of system 0 through the unit 3 of system 2, setting an apparatus address 0A of the redundant appratus 50 and assigning an unit status address (01, 02, 03) to respective one of the first active state, second active state and the standby state. Numeral 55 denotes an address decision circuit for monitoring the state of the units 51–53 of system 0 -system 2, deciding dynamically the unit addresses (for example, 0A01, 0A02, 0A03) of the units 51–53 by combining the apparatus addrss 0A of the redundant apparatus 50 and the unit status address determined in accordance with the state of the units, and inputting the unit addresses to the data sending sections and data receiving sections provided in the units 51–53. FIG. 7 is a diagram for describing the correspondence between the states and the unit status addresses in case of triple redundant structure, in which the unit status address of the first active state is 01, the unit status address of the second active state is 02 and the unit status address of the standby state is 03. Generally, in case of (n+1)-multiplex redundant structure, the correspondence between the states and the unit status addresses is shown in FIG. 8.

Like the system provided with the double redundant structure, the sending data in the system provided with n-multiplex redundant structure is composed of a destination address DA, a source address SA and data DT. The destination address DA attached to the sending data 40 is generated by combining ① the apparatus address of the n-multiplex redundant destination apparatus and ② the status address determined in accordance with whether data is sent to which unit among the first active unit, the second active unit and the standby unit in the redundant destination apparatus. For example, the destination address is 0B01 when the data is sent to the first active unit in the redundant destination apparatus having the apparatus address 0B. And the destination address is 0B02 when the data is sent to the second active unit and the destination address is 0B03 when the data is sent to the standby unit.

Each of the data receiving sections of the units 51–53 in the redundant destination apparatus descriminates whether its own unit address set dynamically agrees with the destination address contained in the sending data 40 and receives the data if agreement is obtained.

(C) Second Embodiment of The Present Invention

In the first embodiment, the system bus is not redundant. But, the present invention is able to be applied to the system in which the system buses have redundant structure.

Figure 9:
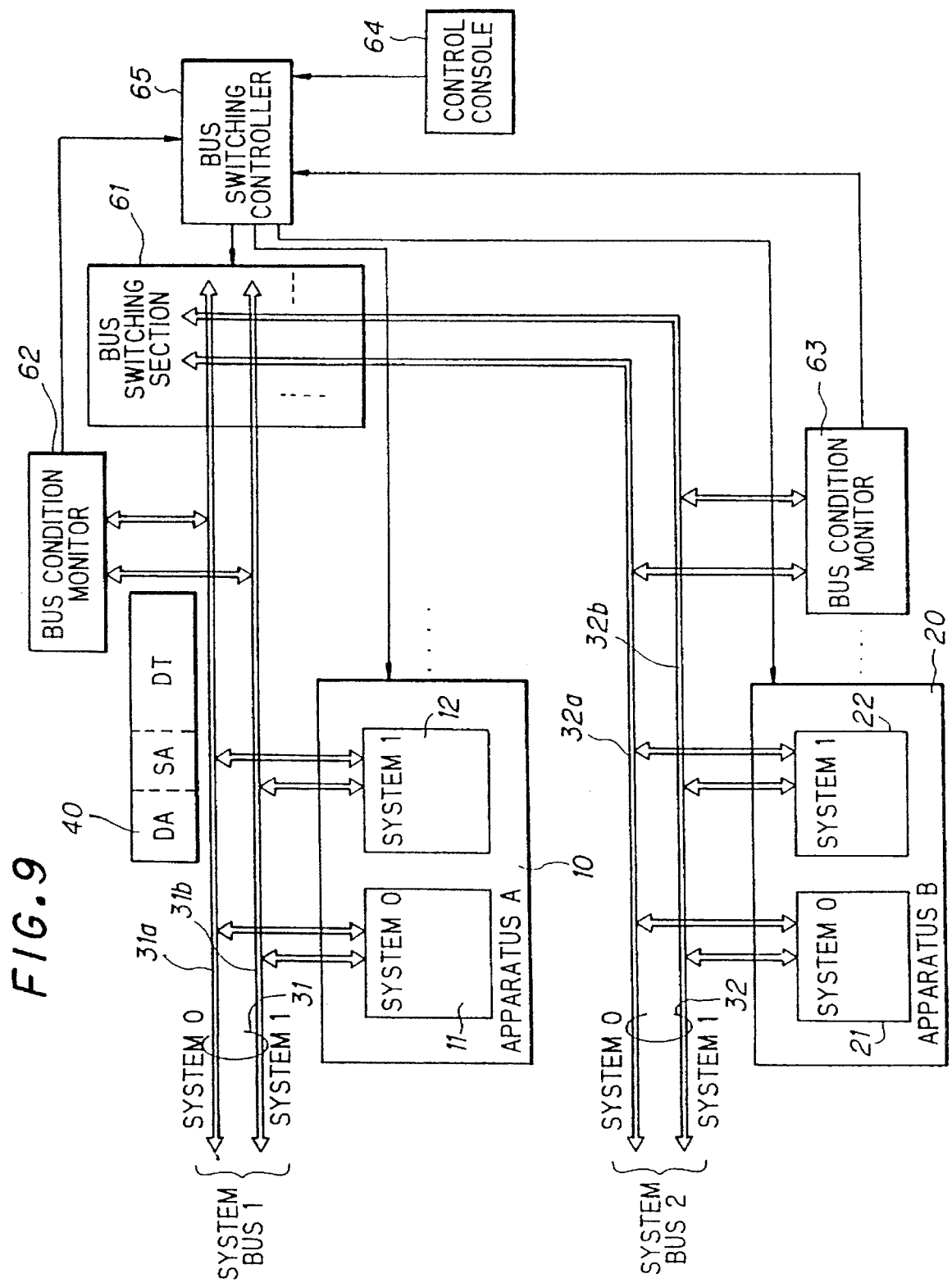
FIG. 9 is a block diagram for describing system of the present invention in a case where system buses are redundant.
Figure 10:
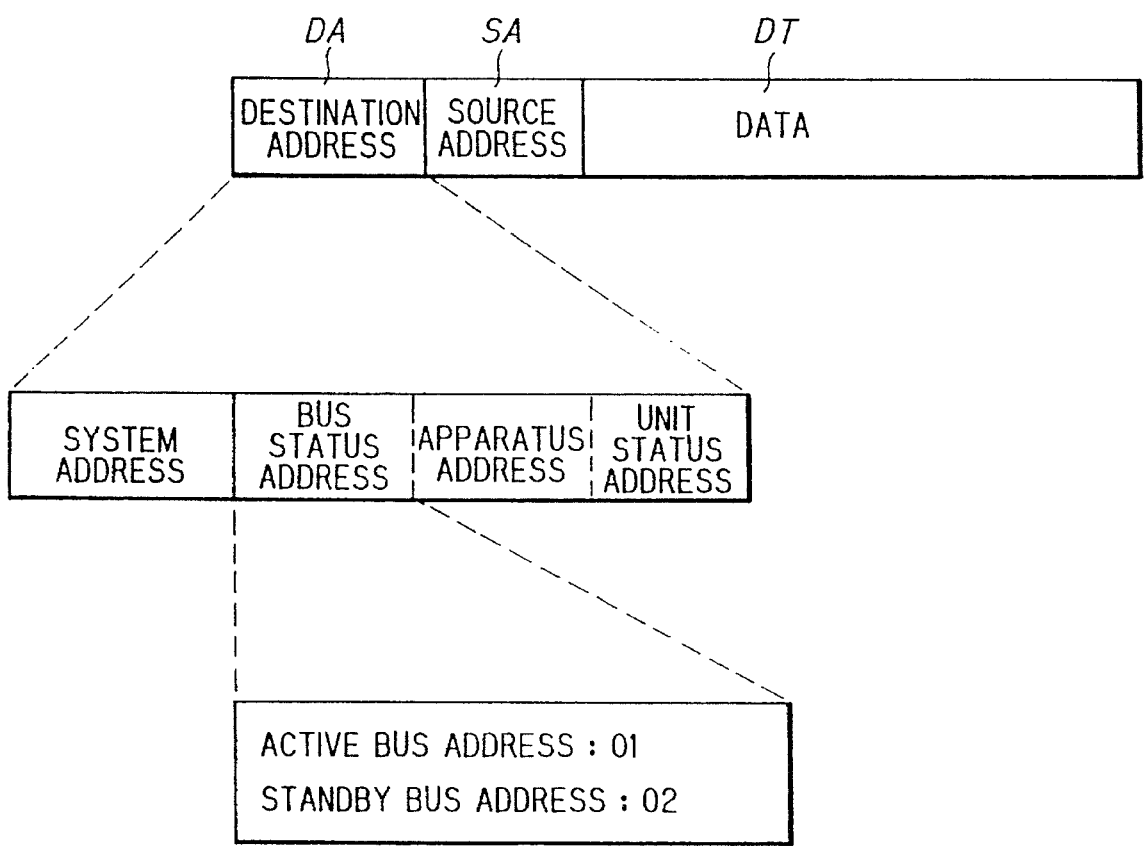
FIG. 10 is a diagram for describing address structure in a case where system buses are redundant.

FIG. 9 is a block diagram for describing system in which system buses are redundant. Numerals 10, 20 denote redundant apparatuses (apparatus A, apparatus B), the redundant apparatus 10 has two unis 11, 12 of system 0 and sytem 1, and the redundant apparatus 20 has two units 21, 22 of system 0 and sytem 1. Numerals 31,32 denote redundant system buses, the redundant system bus 31 is composed of two system buses 31a, 31b of system 0 and system 1, and the redundant system bus 32 is composed of two system buses 32a, 32b of system 0 and system 1. Numerals 40 denote sending data which is composed of a destination address DA, a source address SA and data DT as shown in FIG. 10.

Numeral 61 denotes a bus switching section such as a bus arbiter for sending data to a system bus on the destination side which is appointed by the destination address contained in the sending data 40, numerals 62, 63 bus condition monitors for detecting the failure of the buses 31, 32, numeral 64 control console and numeral 65 a bus switching controller. The bus switching controller 65 renders one of the buses composing the redundant system buses 31, 32 active and the other standby in accordance with the setting data by the control console 64 and the bus condition detected by the bus condition monitors 62, 63. And the bus switching controller 65 notifies the bus arbiter 61 and each redundant apparatus 10, 20 of which bus is active or standby.

Figure 11:
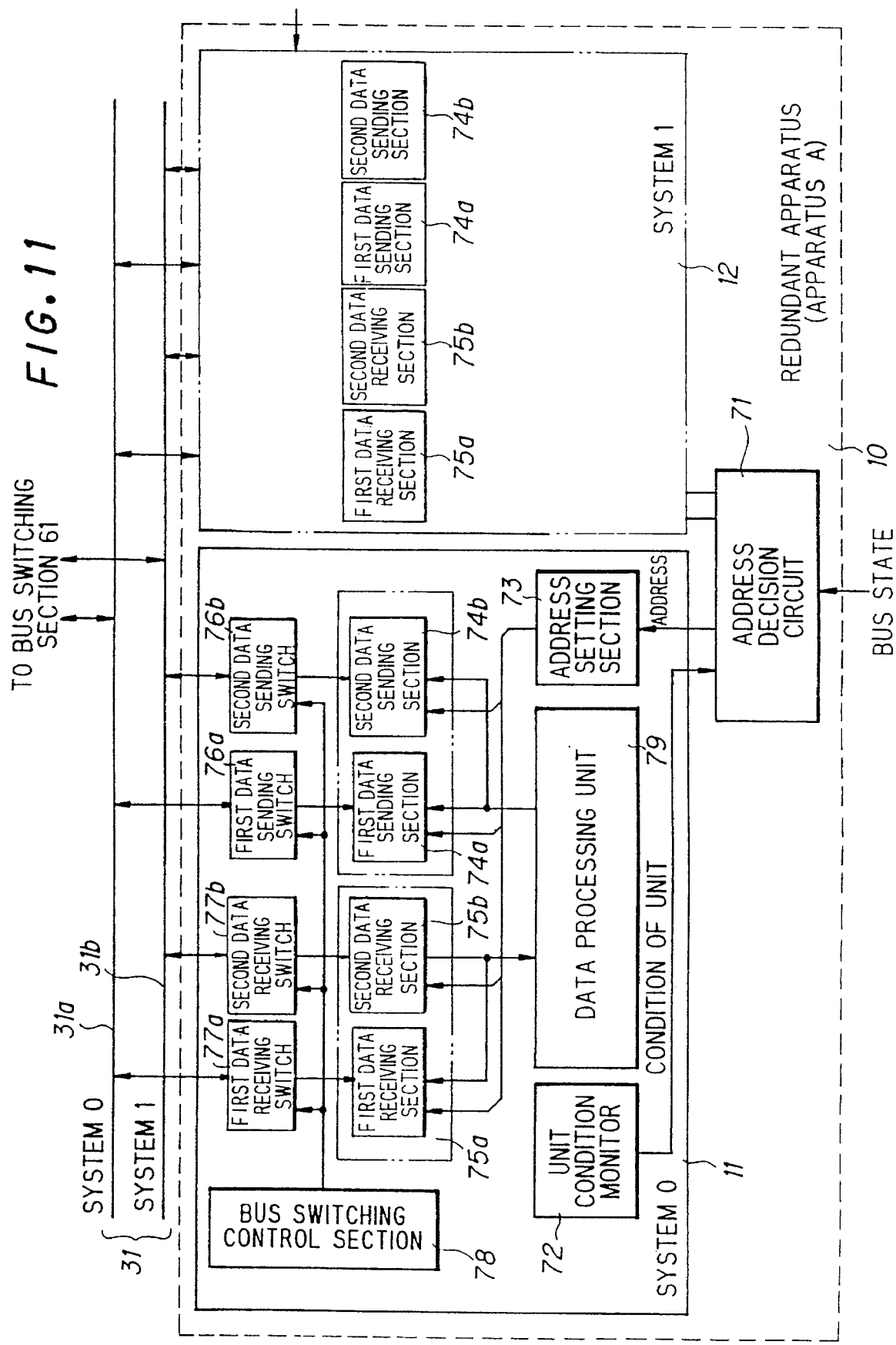
FIG. 11 is a block diagram for describing redundant apparatus in a case where system buses are redundant.
Figure 12A:
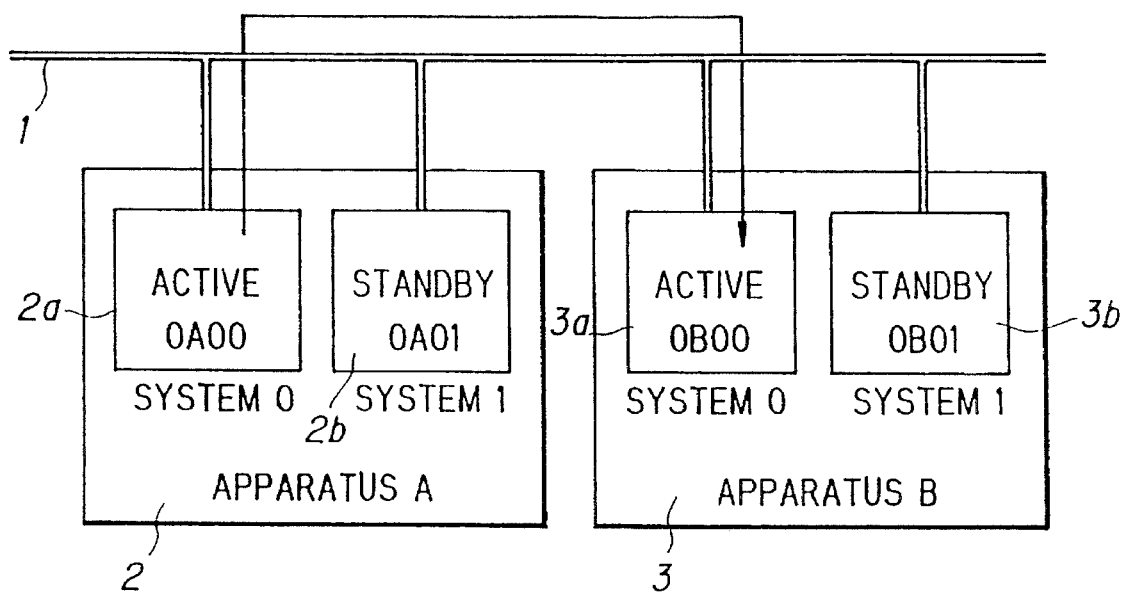
FIG. 12A and FIG. 12B are block diagrams for describing bus communication method of prior art.
Figure 12B:
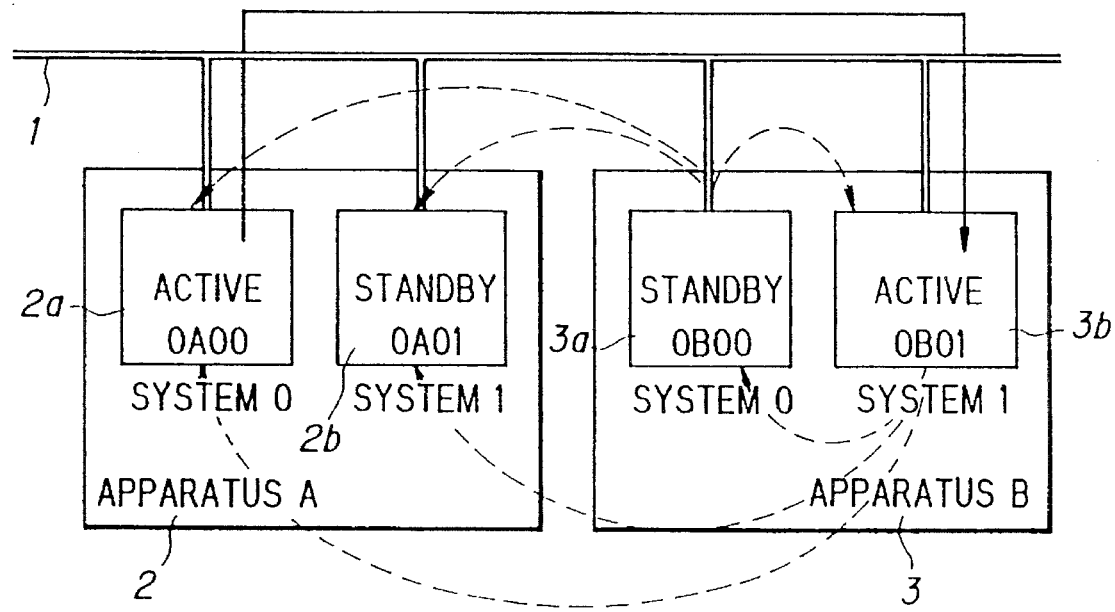

FIG. 11 is a block diagram for describing redundant apparatus 10. Numerals 11 denotes an unit of system 0 and numeral 12 an unit of system 1. While the structure of the unit 11 of system 0 is only shown in FIG. 11, the unit 12 of system 1 has the same structure as the unit 11 of system 0. Numeral 71 denotes an address decision circuit for deciding unit addresses of the units 11, 12 in accordance with the bus state of the system buses 31a, 31b and the state of the units, numeral 72 unit condition monitor, numeral 73 an address setting section for setting the unit address to the data sending sections and data receiving sections, numerals 74a, 74b first and second data sending sections respectively connected to the system bus 31a of system 0 and the system bus 31b of system 1, numeals 75a, 75b first and second data receiving sections respectively connected to the system bus 31a of system 0 and the system bus 31b of system 1, numerals 76a, 76b first and second data sending switches for respectively controling the passage of data from the first and second data sending sections 74a, 74b to the system buses 31a, 31b, numerals 77a, 77b fist and second data receiving switches for respectively controling the passage of data from the system buses 31a, 31b to the first and second data receiving sections 75a, 75b, numeral 78 a bus switching control section for conrtolling the switches 76a–76b, 77a–77b in accordance with the state (active/standby) of the system buses 31a, 31b composing of the redundant system bus 31, and numeral 79 a data processing unit.

(b) Decision of the unit address

The address decision circuit 71 decides two unit addresses every unit by combining ① sytem bus address of the redundant system bus to which the unit is connected, ② bus status address (01 or 02) determined on a basis of the state (active or standby) of the bus to which the unit is connected, ③ an apparatus address and ④ an unit status address (01 or 02) determined on a basis of the state (active or standby) of the unit. Let us assume that ① the system bus address of the redundant system bus 31 is 01, ② the system bus 31a of system 0 is active and the system bus 31b of system 1 is standby, ③ the apparataus address of the redundant apparatus 10 is 0A, and ④ the unit 11 of system 0 is active and the unit 12 of system 1 is standby, the address decision circuit 11 decides two unit address every unit 11,12 by using above information and sets these addressese to the data sending sections 74a–74b and data receiving sections 75a–75b of the units 11, 12. Namely, the address decision circuit 71

① sets the unit address 01010A01 to the first data sending section 74a and the first data receiving section 75a in the unit 11 of system 0, ② sets the unit address 01020A01 to the second data sending section 74b and the second data receiving section 75b in the unit 11 of system 0, ③ sets the unit address 01010A02 to the first data sending section 74a and the first data receiving section 75a in the unit 12 of system 1, and ④ sets the unit address 01020A02 to the second data sending section 74b a and the second data receiving section 75b in the unit 12 of system 1.

(c) Control of sending data and receiving data

In a case where the data is sent from the unit 11 of system 0 by way of the active system bus 31a of the redundant system bus 31 and the active system bus of the redundant system bus 32 to the active unit in the redundant destination apparatus 20, the sequence of the sending/receiving data is performed as follows.

The first data sending section 74a of the unit 11 of system 0 generates a destination address 02010B01 wherein the first two digits "02" means a system bus address of the redundant system bus 32, the second two digits "01" means a bus address of the active bus, the third two digits "0B" means an apparatus address of the destination apparatus 20 and the last two digits "01" means a unit status address of active unit. Thereafter, the data sending section 74a attaches the destination address to the data and then inputs the data to the first data switching section 76a with its own address 01010A01 attached thereto as a source address.

Since the bus switching control section 78 controls to close the switch connected to the active system bus and to open the switch connected to the standby system bus, the data sending switch 76a outputs the data to the system bus 31a.

The sending data 40 arrives at the bus switching section 61 (FIG. 9) by way of the system bus 31a. The bus switching section 61 recognizes that the data should be sent to the active bus of the redundant system bus 32 by reference to the destination address 02010B01 contained in the data 40. On the other hand, since the bus switching controller 65 notifies the bus switching section 61 of the state of the buses 32a, 32b composing the redundant system bus 32. As a result, the bus switching section 61 sends data 40 to the system bus 32a which is active.

In the destination redundant apparatus 20, the data receiving section of the active unit 21 connected to the active system bus 32a descriminates if its own address 02010B01 set dynamically agrees with the destination address DA contained in the data 40. And if agreement is obtained, it receives the data and inputs to the data processing unit.

From the foregoing, the source unit can generate the destination address DA if it recognizes that ① the data should be sent to which redundant apparatus, ② the data should be sent to which unit of active and standby units, ③ the data should be sent by way of which redundant system bus and ④ the data should be sent by way of which bus of active and standby buses.

By reason of this, even if the source unit does not know the actual state of the system buses on the destination side, it can generate a destination address. Accordingly, there is no need to provide a communication mechanism for communicating the state information between the redundant apparatuses, a memory for storing the state of each unit in every apparatus and so on, resulting in simplification of the system and low price of the system.

Thus, in accordance with the invention, since each of the redundant apparatuses decides dynamically unit addresses of the units of system 0 and 1 by using ① the apparatus address and ② the unit status address assigned to active and standby state and sets it to each unit, the source unit can generate the destination address DA if it recognizes that ① data should be sent to which redundant apparatus and ② the data should be sent to which unit of active and standby units. That is to say, unlike the prior art, the source unit need not know the actual state of the units in the destination redundant apparatus. As a result, there is no need to provide a communication mechanism for communicating the state between redundant apparatuses, a memory for storing the state of each unit in every apparatus and so on, resulting in simplification of the system and low price of the system.

In accordance with the invention, since there is no need to communicate the state information between the redundant apparatuses, data communication between them is possible on system sets up.

In accordance with the invention, it is possible to apply the invention to the system having n-multiplex redundant apparatuses each of which is provided with n number of units ($\geq 3$).

In accordance with the invention, it is possible to apply the invention to the the system in which the system buses are redundant. And even if the source unit does not know the actual state of the system buses on the destination side, it can generate a destination address and send data to the destination unit by way of a desirable system bus.

As many apparently widely different embodiments of the present invention can be made without departing from the spirit and scope thereof, it is to be understood that the invention is not limited to the specific embodiments thereof except as defined in the appended claims.

What is claimed is:

1. Bus communication method for sending data with destination address and source address attached thereto from a source unit to a destination unit via a system bus, wherein connected to the system bus are redundant apparatuses each of which is provided with first and second units for working respectively as an active unit and a standby unit and is possible to perform processing continuously by switching over to the standby unit if the active unit fails, comprising steps of:

setting an apparatus address to each redundant apparatus and assigning a unit status address to respective one of active state and standby state;

deciding a unit address of respective one of the first and second units in the redundant apparatus by combining the apparatus address of said redundant apparatus and the unit status address determined in accordance with whether the unit is active or standby;

generating in the source unit, a destination address by combining the unit status address of the destination unit and the apparatus address of destination redundant apparatus to which the destination unit belongs and sending data to the system bus with said destination address attached thereto; and receving the data from the system bus and performing processing in accordance with said data by the destination unit having a unit address which is the same as said destination address.

2. Bus communication method according to claim 1, further comprising;
   generating in the source unit, a source address by combining the unit status address of the source unit and the apparatus address of a source redundant apparatus to which the source unit belongs and attaching the source address to said data.

3. Bus communication method according to claim 1, further comprising;
   changing the unit address of respective one of the first and second units in the predetermined redundant apparatus when the state of the first unit and state of the second unit change each other.

4. Bus communication method according to claim 1, further comprising;
   in a case where system buses are redundant, setting a system bus address to each redundant system bus and assigning a bus status address to respective one of active bus state and standby bus state;
   generating a destination address by combining a system bus address, a bus status address, an apparatus address and a unit status address wherein the system bus address and the bus status address are determined respectively in accordance with whether the data is sent to a destination redundant apparatus by way of which redundant system bus and by way of which system bus of active and standby system buses composing the redundant system bus and the apparatus address and the unit status address are determined respectively in accordance with whether data is sent to which destination redundant apparatus and to which unit of active and standby units in the destination redundant apparatus;
   sending the data to a system bus on the source side with said destination address attached thereto; and
   receiving the data from the system bus on the source side and sending said data to a system bus on the destination side which is appointed by the system bus address and the bus status address contained in the destination address attached to the data.

5. Bus communication method for sending data with destination address and source address attached thereto from a source unit to a destination unit via a system bus, wherein connected to the system bus are redundant apparatuses each of which is provided with n number units (n≧3) for working respectively as one of various active units and standby unit and is possible to perform processing continuously by switching over to the standby unit if one of the active units fails, comprising steps of:
   setting an apparatus address to each redundant apparatus and assigning a unit status address to respective one of various active states and standby state;
   deciding unit address of each of respective one of n number of the units in the redundant apparatus by combining the apparatus address of said redundant apparatus and the unit status address of the unit;
   generating in the source unit, a destination address by combining the status address of the destination unit and the apparatus address of destination redundant apparatus to which the destination unit belongs and sending data to the system bus with said destination address attached thereto; and
   receving the data from the system bus and performing processing in accordance with said data by the destination unit having a unit address which is the same as said destination address.

6. Bus communication system having redundant apparatuses each of which is provided with first and second units for working respectively as an active unit and a standby unit and is possible to perform processing continuously by switching over to the standby unit if the active unit fails and a system bus to which the redundant apparatuses are connected, wherein a source unit sends data to a destination unit via a system bus with destination address and source address attached thereto, said redundant apparatus comprising:
   address decision means for deciding a unit address of respective one of the first and second units in the redundant apparatus by combining an apparatus address which is inherent in said redundant apparatus and a unit status address determined in accordance with whether the unit is active or standby and setting the unit address to the each unit;
   data sending means provided on each of the first and second units for generating a destination address by combining the status address of the destination unit and the apparatus address of destination redundant apparatus to which the destination unit belongs and sending data to the system bus with said destination address attached thereto; and
   data receiving means provided on each of the first and second units for receiving the data from the system bus when the destination address is the same as its own unit address decided by said address decision means.

7. Bus communication system according to claim 6, wherein said data sending means attaches a unit address which is set to the source unit to the data as a source address.

8. Bus communication system according to claim 6, wherein said address decision means changes the unit address of respective one of the first and second units when the state of the first unit and state of the second unit change each other.

9. Bus communication system according to claim 6, further comprising a bus switching means in a case where system buses are redundant, wherein
   said data sending means generates a destination address in accordance with whether the data is sent to the destination redundant apparatus by way of which redundant system bus, whether the data is sent to the destination redundant apparatus by way of which system bus of active and standby system buses composing the redundant system bus and whether the data is sent to which unit of active and standby units in the destination redundant apparatus, and sends the data to a system bus on the source side with said destination address attached thereto ; and
   said bus switching means receives the data from the system bus on the source side and sends said data to a system bus on the destination side which is appointed by the destination address attached to the data.

10. Bus communication system having redundant apparatuses each of which is provided with n number of units (n≧3) for working respectively as one of various active units and a standby unit and is possible to perform processing continuously by switching over to the standby unit if one of the active units fails, and a system bus to which the redundant apparatuses are connected, wherein a source unit sends data to a destination unit via a system bus with destination address and source address attached thereto, said redundant apparatus comprising:
   address decision means for deciding a unit address of respective one of n number of the units in the redundant apparatus by combining an apparatus address which is inherent in said redundant apparatus and a unit status address which is determined in accordance with whether the unit works as which unit among the various active and standby units;

data sending means provided on each of n number units for generating a destination address by combining the status address of the destination unit and the apparatus address of destination redundant apparatus to which the destination unit belongs and sending data to the system bus with said destination address attached thereto; and data receiving means provided on each of n number units for receiving the data from the system bus when the destination address is the same as its own unit address decided by said address decision means.

* * * * *